C. G. DE LAVAL.
FRANGIBLE CLAMPING PIECE FOR FROST PROOF METERS.
APPLICATION FILED JULY 31, 1915.

1,269,064.

Patented June 11, 1918.

Inventor:
Carl George de Laval
by his Attys:

UNITED STATES PATENT OFFICE.

CARL GEORGE DE LAVAL, OF ORANGE, NEW JERSEY, ASSIGNOR TO HENRY R. WORTHINGTON, OF NEW YORK, N. Y., A CORPORATION OF NEW JERSEY.

FRANGIBLE CLAMPING-PIECE FOR FROST-PROOF METERS.

1,269,064.   Specification of Letters Patent.   Patented June 11, 1918.

Application filed July 31, 1915. Serial No. 42,996.

*To all whom it may concern:*

Be it known that I, CARL GEORGE DE LAVAL, a citizen of the United States, residing at Orange, county of Essex, and State of New Jersey, have invented certain new and useful Improvements in Frangible Clamping-Pieces for Frost-Proof Meters, fully described and represented in the following specification and the accompanying drawings, forming a part of the same.

This invention relates particularly to water meters of those classes in which the casing is made with two parts held together by a frangible connection such as to be broken and allow the casing parts to separate on freezing, thus avoiding breakage of the casing or injury to the meter parts, this class of meters being commonly known as frost proof meters.

The especial object of the invention is to provide a simple, cheap and convenient frangible means for securing the parts of the casing together, which will break without injury to any of the parts of the casing, and which shall be applicable generally to meters in which the parts of the casing are bolted together, so that no special construction of meter casing is required but an ordinary meter may be made frost proof by using my device.

In the accompanying drawing forming a part of this specification, the invention is illustrated as applied in a construction of the preferred form, and certain modifications thereof, and these constructions will now be described in detail and the features forming the invention then specifically pointed out in the claims.

In the drawings—

Figure 1:
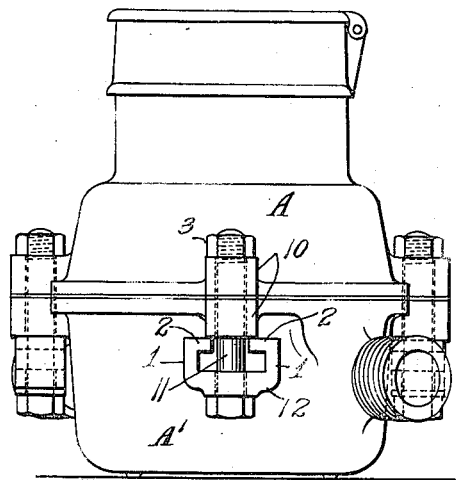
Figure 1 is a side elevation of a disk meter made frost proof in accordance with my invention.

In the drawings, the meter shown is a common type of disk meter, having the casing formed in two parts A, A', and secured together by external lugs 10 receiving bolts 11. In the construction of meters without the frost proof feature, these bolts 11 are secured by nuts or passed through one lug and screwed into the other. For a frost proof meter in accordance with my invention, a frangible clamping piece is placed between the bolt head and one of the lugs 10, so that by the breaking of this frangible member, the two parts of the casing will be allowed to separate on the bolt, and without breaking or detaching the latter.

Figure 2:
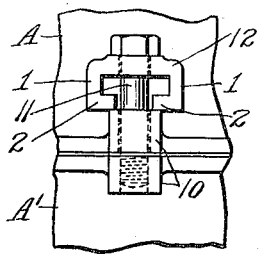
Fig. 2 is a detail view of a portion of Fig. 1, showing the same frost proof washer as in Fig. 1, but with the casing parts and washer secured in a different manner.

In the preferred form shown in Figs. 1 and 2, the frangible clamping piece is a washer 12 which consists of a cross bar or disk having an opening through which the bolt is passed, and two arms 1 extending parallel with and on opposite sides of the bolt and having inwardly extending flanges 2, which rest against the lug 10. As shown in Fig. 1, the washer 12 is on the lower side of the lugs, and the bolt is simply passed through the washer and lugs and drawn up tight to secure the parts together by nut 3, while in Fig. 2 the washer 12 is applied above the lugs 10, and bolt 11 passes through the upper lug and is screwed into the lower lug. The flanges 2 are so constructed as to break under a certain pressure and permit the lugs and casing parts to separate on bolts 11.

Figure 3:
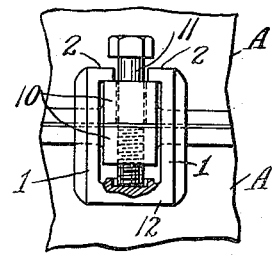
Figs. 3 and 4 are detail views similar to Fig. 1, showing modified forms of construction.

In Fig. 3 a modified form of clamping piece 12 is shown, in which the arms 1 are of sufficient length to allow the disk or cross bar to lie on one side of the two lugs, and the flanges 2 to overlap the opposite side of the lugs, the bolt 11 then being passed through one lug and screwed through the other against the cross bar or disk of the clamping piece.

Figure 4:
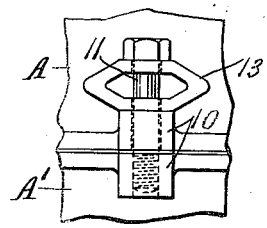

In Fig. 4 a construction similar to Fig. 2 is shown, except that the flanges on the arms are united into a cross bar or disk, and the arms and flanges are inclined to the bolt 11, thus forming a hollow frangible washer 13 between the bolt head and lug 10, the action being secured by the breaking of the washer being the same as by the breaking of the flanges or other parts of the frangible clamping pieces shown in Figs. 1 to 3.

It will be understood that the invention is not limited to the exact form or construction of any of the frangible clamping pieces shown, but that these may be modified within the invention defined by the claims. While the invention is especially intended for water meters, it will be understood that it may be applied also to other articles having a two-part casing in which it is desired that the parts shall yield and separate on excessive pressure from freezing or otherwise.

What I claim is:

1. In a frost proof water meter or the like, a casing having two parts and bolts passing through projecting portions of the casing parts for holding the parts together, and rigid clamping pieces on said bolts, said clamping pieces having frangible arms with inwardly extending portions on opposite sides of the bolt and forming a frangible connection between the bolt and projecting portions of the casing parts, whereby the casing parts are allowed to separate on the bolts on breaking of the clamping pieces.

2. A frangible rigid clamping piece for frost proof meters and the like, having a cross bar with a bolt opening through it, and arms on the opposite sides of the cross bar having inwardly extending portions, said cross bar and inwardly extending portions of the arms being adapted to form a frangible connection between the bolt and casing parts and to allow the casing parts to separate on breaking of the clamping piece.

In testimony whereof, I have hereunto set my hand in the presence of two subscribing witnesses.

CARL GEORGE DE LAVAL.

Witnesses:
W. J. FRITCHMAN,
H. T. HEDDEN.